United States Patent
Cassagnes et al.

(10) Patent No.: US 10,119,822 B2
(45) Date of Patent: Nov. 6, 2018

(54) IN-BAND BEATING REMOVAL FOR A MEMS GYROSCOPE

(71) Applicants: Thierry Cassagnes, Tournefeuille (FR); Hugues Beaulaton, Toulouse (FR); Laurent Cornibert, Toulouse (FR); Yean Ling Teo, Goyrans (FR)

(72) Inventors: Thierry Cassagnes, Tournefeuille (FR); Hugues Beaulaton, Toulouse (FR); Laurent Cornibert, Toulouse (FR); Yean Ling Teo, Goyrans (FR)

(73) Assignee: NXP USA, Inc., Austin, TX (US)

( * ) Notice: Subject to any disclaimer, the term of this patent is extended or adjusted under 35 U.S.C. 154(b) by 252 days.

(21) Appl. No.: 15/035,869

(22) PCT Filed: Nov. 22, 2013

(86) PCT No.: PCT/IB2013/003155
§ 371 (c)(1),
(2) Date: May 11, 2016

(87) PCT Pub. No.: WO2015/075499
PCT Pub. Date: May 28, 2015

(65) Prior Publication Data
US 2016/0290804 A1    Oct. 6, 2016

(51) Int. Cl.
*G01C 19/5726* (2012.01)
*G01C 19/04* (2006.01)
(Continued)

(52) U.S. Cl.
CPC ......... *G01C 19/5726* (2013.01); *G01C 19/04* (2013.01); *G06F 1/08* (2013.01);
(Continued)

(58) Field of Classification Search
CPC ..... H03L 7/00; H03L 7/06; H03L 7/16; H03L 7/18; H03L 7/24; H04L 7/00;
(Continued)

(56) References Cited

U.S. PATENT DOCUMENTS 5,353,025 A * 10/1994 Leonida ............... H03M 1/46
                                                    341/122
6,519,706 B1    2/2003 Ogoro
(Continued)

FOREIGN PATENT DOCUMENTS

CN      1949128 A      4/2007
EP      2 360 448 A1   8/2011
(Continued)

OTHER PUBLICATIONS

Banerjee, K. et al; "A carrier peak synchronous direct digital demodulation technique and its FPGA implementation"; Microprocessors and Microsystems 28, Elsevier; pp. 37-46 (2004).
(Continued)

*Primary Examiner* — Young T Tse
(74) *Attorney, Agent, or Firm* — Charlene R. Jacobsen

(57) ABSTRACT

Vibration gyroscope circuitry, connectable to a vibrating MEMS gyroscope, includes drive circuitry for driving the gyroscope and a measurement circuit for providing a drive measurement signal indicating displacement of a mass along a drive axis. Sense circuitry processes a sense measurement signal of the gyroscope indicating displacement of the mass along a sense axis. A digital sample clock generator includes an oscillator for generating a master clock, a counter for counting master clock periods during one period of an input signal derived from the drive measurement signal, and a number count monitor for determining during how many input signal periods the number count stays constant and for comparing a number of constant periods with a critical
(Continued)

number of constant periods. A frequency shifter triggers the oscillator to shift the master clock frequency whenever the monitor determines that the number of constant periods exceeds the critical number of constant periods.

12 Claims, 12 Drawing Sheets

(51) Int. Cl.
    *G01F 1/08*     (2006.01)
    *H04L 7/033*     (2006.01)
    *H04L 7/06*     (2006.01)
    *G06F 1/08*     (2006.01)
    *G06F 1/16*     (2006.01)

(52) U.S. Cl.
    CPC ............ *G06F 1/1694* (2013.01); *H04L 7/033* (2013.01); *H04L 7/06* (2013.01)

(58) Field of Classification Search
    CPC ..... H04L 7/0016; H04L 7/0037; H04L 7/033; H04L 7/0334; H04L 7/04; H04L 7/06; G01C 19/00; G01C 19/02; G01C 19/04; G01C 19/06; G01C 19/5705; G01C 19/5726; G01C 19/5733; G01F 1/04; G01F 1/06; G01F 1/08; G01F 1/10; G01F 1/12; G01F 1/16
    USPC .... 375/354, 355, 362, 364, 369; 326/93, 96; 713/400, 401, 500–502
    See application file for complete search history.

(56) References Cited

U.S. PATENT DOCUMENTS

| | | |
|---|---|---|
| 7,554,368 B2 | 6/2009 | Yu |
| 7,665,360 B2 | 2/2010 | Kurihara |
| 9,116,562 B2 | 8/2015 | Beaulaton et al. |
| 2004/0158759 A1 | 8/2004 | Chang et al. |
| 2005/0081076 A1 | 4/2005 | Okuda |
| 2008/0018374 A1 | 1/2008 | Fujii |
| 2011/0179868 A1 | 7/2011 | Kaino et al. |
| 2011/0102258 A1 | 8/2011 | Underbrink et al. |
| 2011/0197674 A1 | 8/2011 | Prandi et al. |
| 2011/0199154 A1 | 8/2011 | Pu et al. |
| 2012/0022779 A1 | 8/2012 | Lee |
| 2013/0099836 A1 | 8/2013 | Shaeffer et al. |
| 2014/0218082 A1 | 8/2014 | Fan |
| 2014/0251009 A1 | 8/2014 | Schlarmann et al. |
| 2014/0260713 A1 | 9/2014 | Shaeffer et al. |
| 2014/0269813 A1 | 9/2014 | Lee et al. |
| 2014/0305207 A1 | 10/2014 | Entringer et al. |
| 2015/0345946 A1* | 12/2015 | Cassagnes ......... G01C 19/5776 73/504.12 |
| 2016/0231119 A1* | 8/2016 | Beaulaton .......... G01C 19/5726 |

FOREIGN PATENT DOCUMENTS

| | | |
|---|---|---|
| GB | 2 424 706 A | 10/2006 |
| JP | 2006153715 A | 6/2015 |
| WO | WO-97/36370 A1 | 10/1997 |
| WO | WO 2014/006437 A1 * | 9/2014 |

OTHER PUBLICATIONS

International Search Report for application PCT/IB2013/003155 (dated Sep. 2, 2014).

\* cited by examiner

| XY harm # | XY harm freq | Z harm # | Z harm freq |
|---|---|---|---|
| 933 | 1.58610E+07 | 834 | 1.58460E+07 |
| 934 | 1.58780E+07 | 835 | 1.58650E+07 |
| 935 | 1.58950E+07 | 836 | 1.58840E+07 |
| 936 | 1.59120E+07 | 837 | 1.59030E+07 |
| 937 | 1.59290E+07 | 838 | 1.59220E+07 |
| 938 | 1.59460E+07 | 839 | 1.59410E+07 |
| 939 | 1.59630E+07 | 840 | 1.59600E+07 |
| 940 | 1.59800E+07 | 841 | 1.59790E+07 |
| 941 | 1.59970E+07 | 842 | 1.59980E+07 |
| 942 | 1.60140E+07 | 843 | 1.60170E+07 |
| 943 | 1.60310E+07 | 844 | 1.60360E+07 |
| 944 | 1.60480E+07 | 845 | 1.60550E+07 |
| 945 | 1.60650E+07 | 846 | 1.60740E+07 |
| 946 | 1.60820E+07 | 847 | 1.60930E+07 |
| 947 | 1.60990E+07 | 848 | 1.61120E+07 |
| 948 | 1.61160E+07 | 849 | 1.61310E+07 |
| 949 | 1.61330E+07 | 850 | 1.61500E+07 |

Freq [Hz]

IN-BAND BEATING REMOVAL FOR A MEMS GYROSCOPE

FIELD OF THE INVENTION

This invention relates to vibration gyroscope circuitry, vibration gyroscope device, apparatuses, semiconductor devices and methods.

BACKGROUND OF THE INVENTION

Vibrating micro-electro-mechanical-system (MEMS) gyroscopes are used in a variety of systems where an angular rotation rate is to be measured. A vibrating MEMS gyroscope hereto comprises a gyroscope mass that is connected by springs to a substrate. The gyroscope mass is movable along a driving axis in resonant oscillation by the use of a drive force to provoke and maintain the movement. The drive force is supplied and controlled using a drive actuation unit and a drive measurement unit and associated circuitry.

The drive actuation unit comprises, e.g., a capacitive coupling along the driving axis between a capacitor plate on the substrate and an opposite capacitor plate on the movable gyroscope mass. A force acting on the gyroscope mass may be induced as a capacitive force by applying a voltage to the capacitor plates of the drive actuation unit, whereby the gyroscope mass is moved.

The drive measurement unit comprises, e.g., a similar pair of capacitor plates. The capacitance between the capacitor plates of the drive measurement unit is measured as a drive measurement signal and forms an indication of the displacement of the gyroscope mass along the driving axis.

A Coriolis force will apply to the gyroscope mass in the presence of an angular rotation. The Coriolis force is proportional to the velocity of the gyroscope mass, its angular rate of rotation and its mass, and perpendicular to the direction of movement. The Coriolis force hereby results in a displacement of the gyroscope mass along a sensing axis perpendicular to the driving axis. Measurement of the displacement of the gyroscope mass along the sensing axis can be used to obtain a measure of the Coriolis force and thus a measure of the angular rate of rotation. Hereto, a sense measurement unit is provided which, similar to the drive measurement unit, may comprise a capacitive coupling along the sensing axis between a sense capacitor plate on the substrate and an opposite sense capacitor plate on the movable gyroscope mass. The capacitance between the sense capacitor plates of the sense measurement unit is measured as a sense measurement signal and forms an indication of the displacement of the gyroscope mass along the sensing axis.

Determination of the angular rotation rate requires a consistent movement of the gyroscope mass along the driving axis. Hereto, the vibrating MEMS gyroscope comprises a drive circuitry to measure and control the amplitude of the, sinusoidal, movement of the gyroscope mass. In a vibrating MEMS gyroscope, measuring and controlling may be performed by determining a difference between a reference amplitude and the amplitude of the movement and controlling a gain of a drive actuation signal to control the drive actuation unit to supply the voltage to the capacitor plates of the drive actuation unit in accordance with the gain.

In known vibrating MEMS gyroscopes, the amplitude of the movement may be measured by sampling the drive measurement signal once every period at extremes of the drive measurement signal by the use of a phase-locked loop (PLL) to determine an in-phase clock with an appropriate phase relative to the drive measurement signal from drive measurement signal to coincide with the extremes of the drive measurement signal. The PLL may thus maintain the appropriate phase also when the period of the drive measurement signal is changing, e.g., due to a change of the oscillation period of the gyroscope mass due to, e.g., environmental conditions such as temperature.

Determination of the angular rotation rate is performed by determining a measure of the amplitude and relative phase of the, sinusoidal, displacement of the gyroscope mass along the sensing axis, the relative phase being measured relative to the displacement of the gyroscope mass along the driving axis. Hereto, the vibrating MEMS gyroscope comprises a sense circuitry to sample the sense measurement signal with a phase relation with the drive measurement signal using an in-phase clock to obtain in-phase sense-measurement samples and to sample the sense measurement signal at a quadrature phase relative to the drive measurement signal using a quadrature clock to obtain quadrature sense-measurement samples associated with a, so-called, quadrature signal between the sense measurement signal and the drive measurement signal. Combining the in-phase sense-measurement samples and the quadrature sense-measurement samples then allows to determine the amplitude of the displacement along the sensing axis, and thereby a measure of the angular rotation rate and a measure of an amplitude of the quadrature signal.

In known vibrating MEMS gyroscopes, a phase-locked loop (PLL) is used to establish the in-phase clock from the drive measurement signal and, in some known vibrating MEMS gyroscopes, another phase-locked loop (PLL) is used to establish the quadrature clock from the drive measurement signal.

SUMMARY OF THE INVENTION

The present invention provides a vibration gyroscope circuitry, a vibration gyroscope device, an apparatus, a semiconductor device and methods as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. Elements in the FIGS. are illustrated for simplicity and clarity and have not necessarily been drawn to scale.

DETAILED DESCRIPTION OF THE PREFERRED EMBODIMENTS

Because the examples below may, for the most part, be composed of electronic components and circuits known to those skilled in the art, details will not be explained in any greater extent than that considered necessary for the understanding and appreciation of the underlying concepts of the present invention and in order not to obfuscate or distract from the teachings of the present invention.

Figure 1:
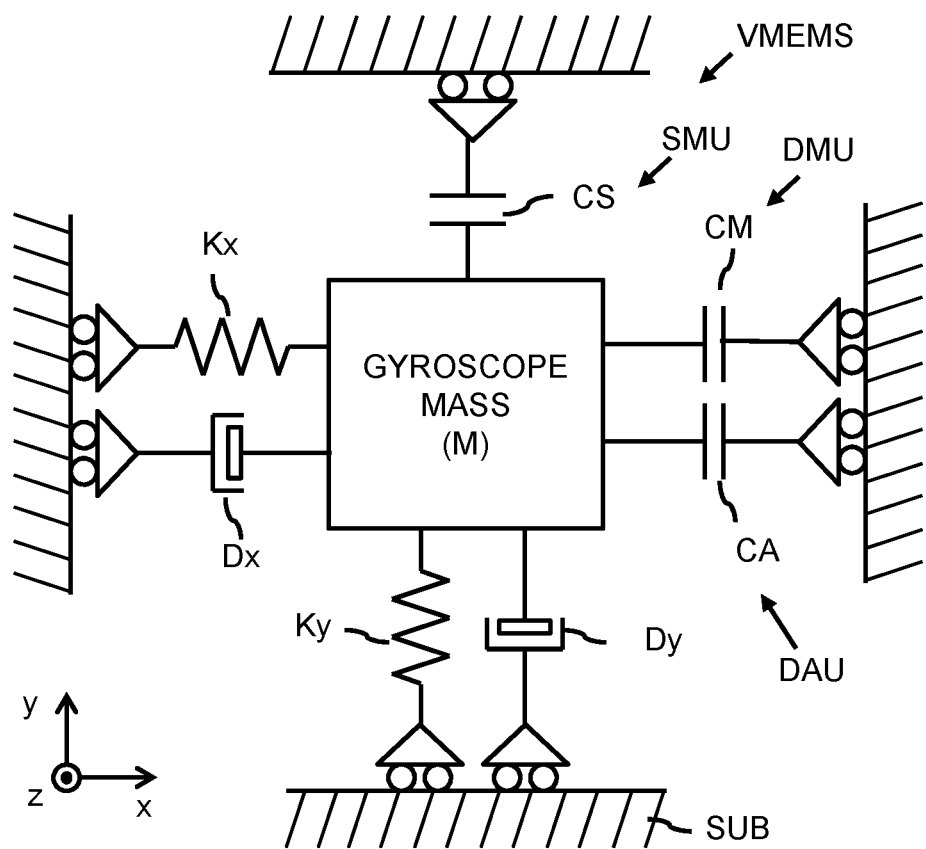
FIG. 1 is a functional diagram schematically showing an example of a vibration MEMS gyroscope.

FIG. 1 schematically shows an example of a vibration MEMS gyroscope VMEMS. The vibrating MEMS gyroscope VMEMS has a gyroscope mass M that is connected by springs, indicated with respective spring coefficients Kx, Ky, to a substrate SUBS. FIG. 1 further schematically indicates pistons Dx and Dy indicating a modelling of damping behaviour of the springs and friction, such as air friction, of movement of the gyroscope mass M. The gyroscope mass M is movable along a driving axis x using a drive force. The drive force is supplied and controlled using a drive actuation unit DAU and a drive measurement unit DMU and associated circuitry (exemplary circuitry is shown and described below). The drive actuation unit DAU comprises a drive capacitor CA having a drive capacitor plate connected to the substrate SUB and an opposite drive capacitor plate connected to the movable gyroscope mass M. The opposite drive capacitor plate may be formed by a part of the movable mass M. The drive capacitor CA of the drive actuation unit DAU is oriented such that a capacitive force between the drive capacitor plate and the opposite drive capacitor plate is oriented along the drive axis x for providing the drive force to displace the gyroscope mass M.

The drive measurement unit DMU comprises a measurement capacitor CM having a measurement capacitor plate connected to the substrate SUB and an opposite measurement capacitor plate connected to the movable gyroscope mass M. The opposite measurement capacitor plate may be formed by a part of the movable mass M. The measurement capacitor CM of the drive measurement unit DMU is oriented such that a capacitive force between the measurement capacitor plate and the opposite measurement capacitor plate is oriented along the drive axis x. A measure of the capacitive force between the measurement capacitor plate and the opposite measurement capacitor may thus provide a measure of the displacement of the gyroscope mass M along the drive axis.

The sense measurement unit SMU comprises a sense capacitor CS having a sense capacitor plate connected to the substrate SUB and an opposite sense capacitor plate connected to the movable gyroscope mass M. The opposite sense capacitor plate may be formed by a part of the movable mass M. The sense capacitor CS of the sense measurement unit SMU is oriented such that a capacitive force between the sense capacitor plate and the opposite sense capacitor plate is oriented along a sense axis y, the sense axis y being perpendicular to the drive axis x.

Figure 2:
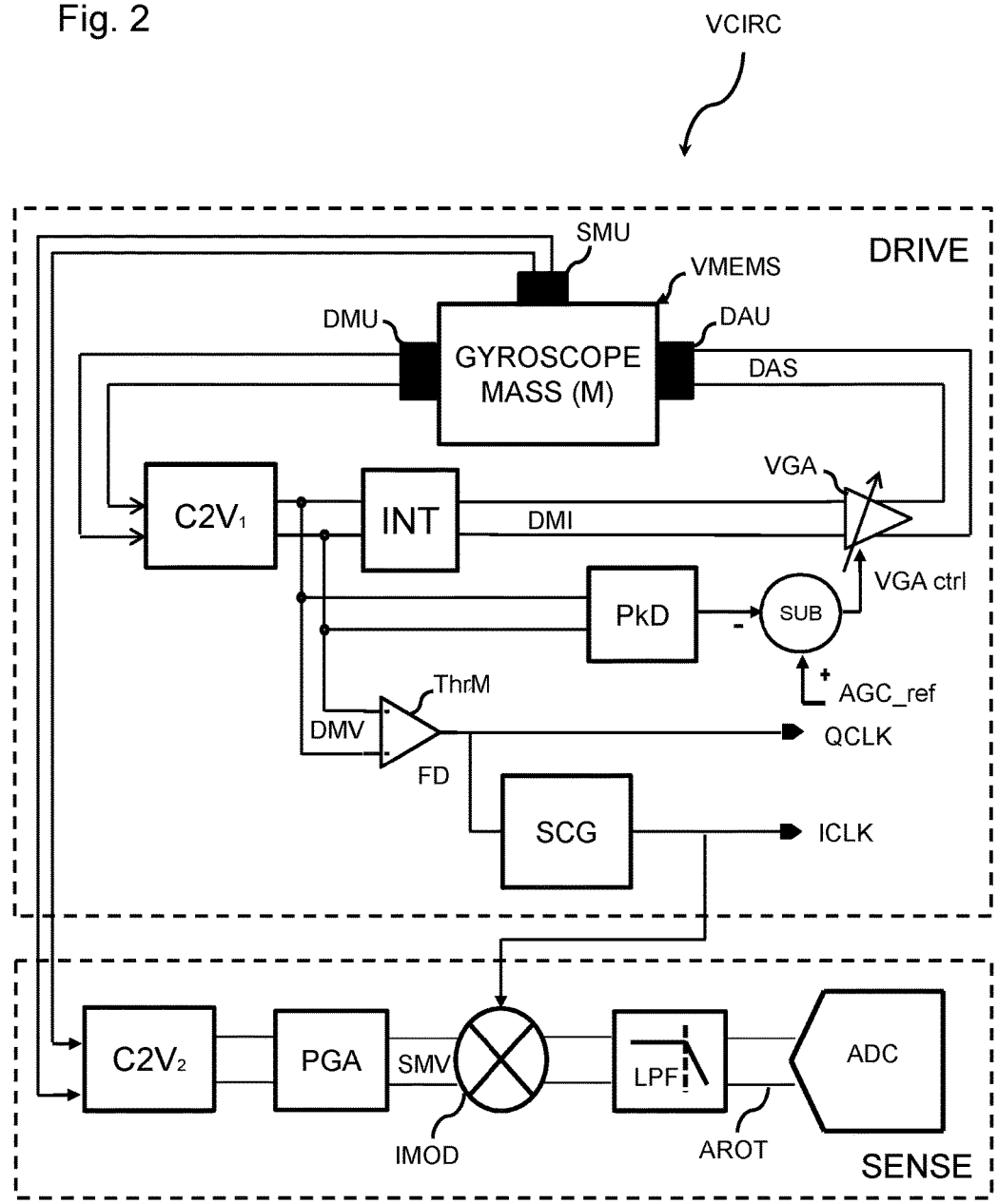
FIG. 2 is a block diagram schematically showing an example of an embodiment of a vibration gyroscope circuitry.

FIG. 2 schematically shows an example of an embodiment of a vibration gyroscope circuitry VCIRC comprising a drive circuitry DRIVE and a sense circuitry SENSE. The drive circuitry DRIVE is arranged to drive a vibration MEMS gyroscope VMEMS. The sense circuitry SENSE is arranged to process a sense measurement signal of the vibration MEMS gyroscope VMEMS.

The vibration MEMS gyroscope VMEMS may for example be the vibration MEMS gyroscope VMEMS shown in FIG. 1. In the example of FIG. 2, the drive circuitry DRIVE is shown connected to the drive actuation unit DAU and the driver measurement unit DMU and the sense circuitry SENSE is connected to the sense measurement unit SMU. However the two circuitries DRIVE, SENSE may also be suitable and used together with other types of vibration MEMS gyroscopes than the one shown in FIG. 1.

The drive circuitry DRIVE may be implemented in any manner suitable for the specific implementation. In the shown example, the drive circuitry DRIVE comprises a first capacitance-to-voltage unit $C2V_1$, a peak detector PkD, an integrator INT and a variable gain amplifier VGA.

The first capacitance-to-voltage unit $C2V_1$ is connected to the measurement capacitor CM of the drive measurement unit DMU and is arranged to provide a measure of the capacitance between the capacitor plates of the measurement capacitor CM as a drive measurement voltage signal DMV. Hereby, the first capacitance-to-voltage unit $C2V_1$ is arranged to provide a drive measurement voltage signal DMV indicative of a displacement of a gyroscope mass M along a drive axis x of a vibrating MEMS gyroscope VMEMS.

The variable gain amplifier VGA is connected to the drive capacitor CA of the drive actuation unit DAU to provide a drive voltage signal DAS to the drive capacitor CA, resulting in a capacitive force between the capacitor plates of the drive capacitor CA, oriented along the driving axis, and thereby invoke and maintain the movement of the gyroscope mass M along the driving axis x.

The integrator INT is arranged to integrate the drive measurement voltage signal DMV to obtain an integrated drive measurement voltage signal DMI. The integrator effectively shifts the phase of the drive measurement voltage signal DMV by 90 degrees to compensate for the phase lag of the vibrating MEMS between drive signal and drive measurement signal.

The peak detector PkD is arranged to detect a peak of the drive measurement voltage signal DMV to obtain peak value. The peak value is subtracted from an AGC_REF signal using a subtractor SUB the gain factor g for the variable gain amplifier VGA. Hereby, the drive circuitry DRIVE may control the vibration MEMS gyroscope VMEMS to oscillate with a pre-determined amplitude corresponding to the pre-determined reference envelope amplitude AGC_ref.

The threshold detector ThrM is arranged to perform a threshold detection on the drive measurement voltage signal DMV to obtain a digital signal FD. The threshold detection uses a threshold value corresponding to the zero level of the drive measurement voltage signal DMV, such that sign changes of the drive measurement voltage signal DMV are reflected in the digital signal FD. The digital sample clock generator SCG is arranged to receive the digital signal FD as an input signal and to generate a sample clock ICLK in dependence on a pre-determined in-phase phase shift fraction PhI as an in-phase sample clock ICLK so as to obtain the in-phase sample clock in-phase with the drive measurement voltage signal DMV. The in-phase sample clock is thus arranged to match extremes in the drive measurement voltage signal DMV, allowing to effectively sample the envelope of the drive measurement voltage signal DMV using the in-phase sample clock.

The drive circuitry DRIVE, and more specifically the digital sample clock generator SCG, thus generates an in-phase sample clock ICLK without using a PLL (phase-locked loop). Hereby, at least some of the disadvantages associated with using a PLL are alleviated, such as the PPL's need for external components and an external pin associated with a loop filter of the PLL, a settling time of the PLL, a semiconductor device area required for a PLL and/or power consumption of a PLL.

The pre-determined reference envelope amplitude AGC_ref and/or the pre-determined in-phase phase shift fraction PhI may be pre-stored in a non-volatile memory (not shown) of the drive circuitry DRIVE, e.g., be programmed during the manufacturing by a user. The non-volatile memory may be integrated with the drive circuitry DRIVE or provided as a separate memory device. The pre-determined reference envelope amplitude AGC_ref and/or pre-determined in-phase phase shift fraction PhI may be provided, during use of the drive circuitry DRIVE, by a user, such as a controller arranged to operate and control the drive circuitry DRIVE.

The sense circuitry SENSE comprises a second capacitance-to-voltage unit C2V$_2$, a programmable gain amplifier PGA, a sampler IMOD, a low pass filter LPF and an analogue digital converter ADC.

The second capacitance-to-voltage unit C2V$_2$ is connected to the sense capacitor CS of the sense measurement unit SMU and is arranged to provide a measure of the capacitance between the capacitor plates of the sense capacitor CS as a sense measurement voltage signal SMV. Hereby, the second capacitance-to-voltage unit C2V$_2$ is arranged to provide a sense measurement voltage signal SMV indicative of a displacement of the gyroscope mass M along a sense axis y, the sense axis x being at a sense angle relative to the drive axis x. Such displacement may be associated with the Coriolis force induced by an angular rotation rate.

The sampler IMOD is connected to the digital sample clock generator SCG to receive the in-phase sample clock ICLK from the digital sample clock generator SCG. The sampler IMOD is connected to the second capacitance-to-voltage unit C2V$_2$ to receive the sense measurement voltage signal SMV from the second capacitance-to-voltage unit C2V$_2$. The programmable gain amplifier PGA receives the output voltage of the second capacitance-to-voltage unit C2V$_2$ and amplifies the voltage to obtain a sense measurement voltage signal SMV. The sampler IMOD is arranged to sample the sense measurement voltage signal SMV with the in-phase sample clock ICLK to obtain in-phase sense sample values. The analogue digital converter ADC may be part of (or connected to) a sample processor (not shown in FIG. 2) arranged to determine a measure AROT of an angular rate in dependence on at least the in-phase sense samples and to output the measure AROT to another unit (not shown) in analogue or digital form. Determining as such of an angular rate is known to the skilled person and is not described in further detail here.

The measure AROT may be an analogue measure and the sense circuitry SENSE may further comprise an analogue to digital convertor ADC to convert the analogue measure into a digital value.

Figure 3:
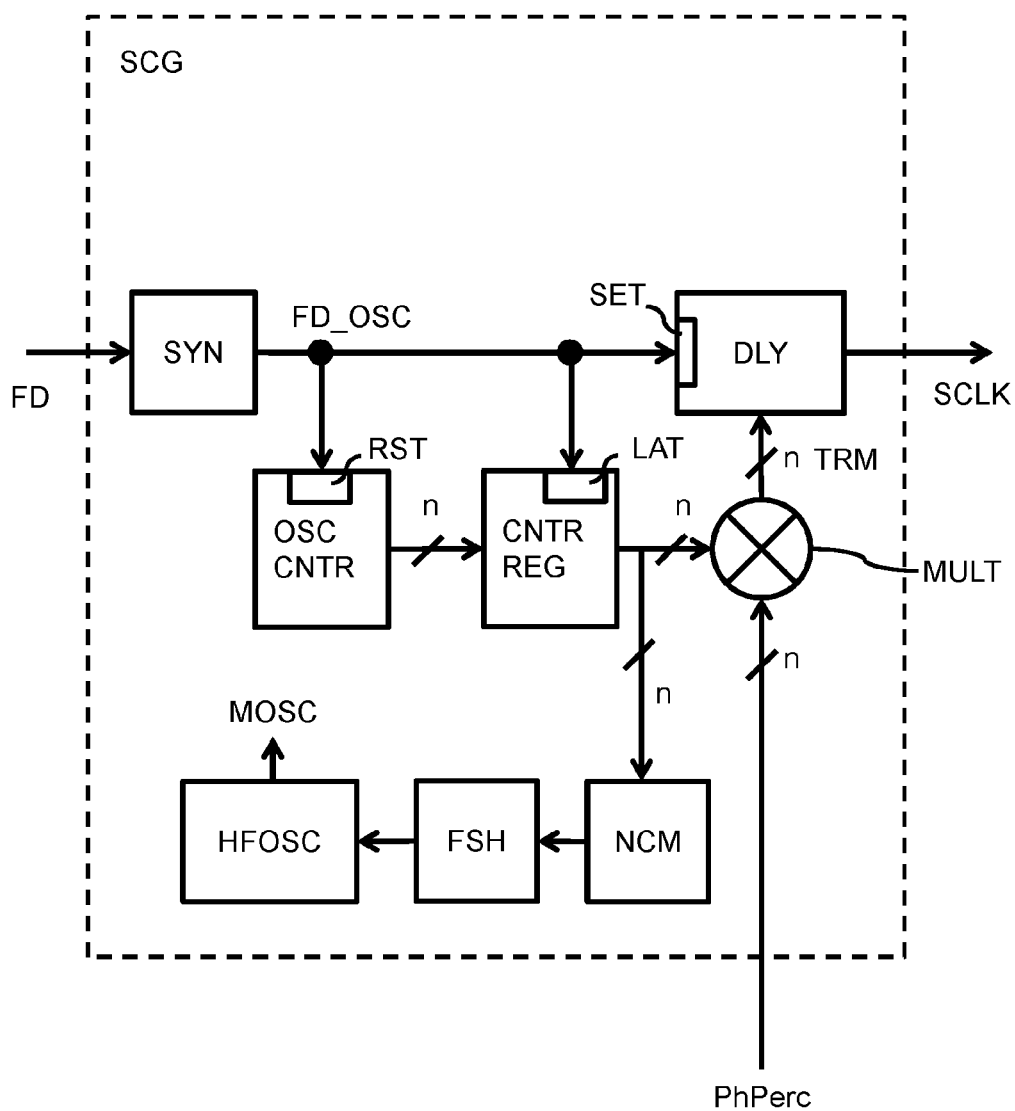
FIG. 3 is a block diagram schematically showing an example of an embodiment of the sample clock generator SCG, which can be used in the example of FIG. 2.

FIG. 3 schematically shows an example of an embodiment of the sample clock generator SCG. The operation of the sample clock generator SCG will be described with reference to schematic, simplified, exemplary signals FD, MOSC, FD_OSC, FD_OSC', SCLK shown in FIG. 4 with time t progressing from left to right.

Figure 4:
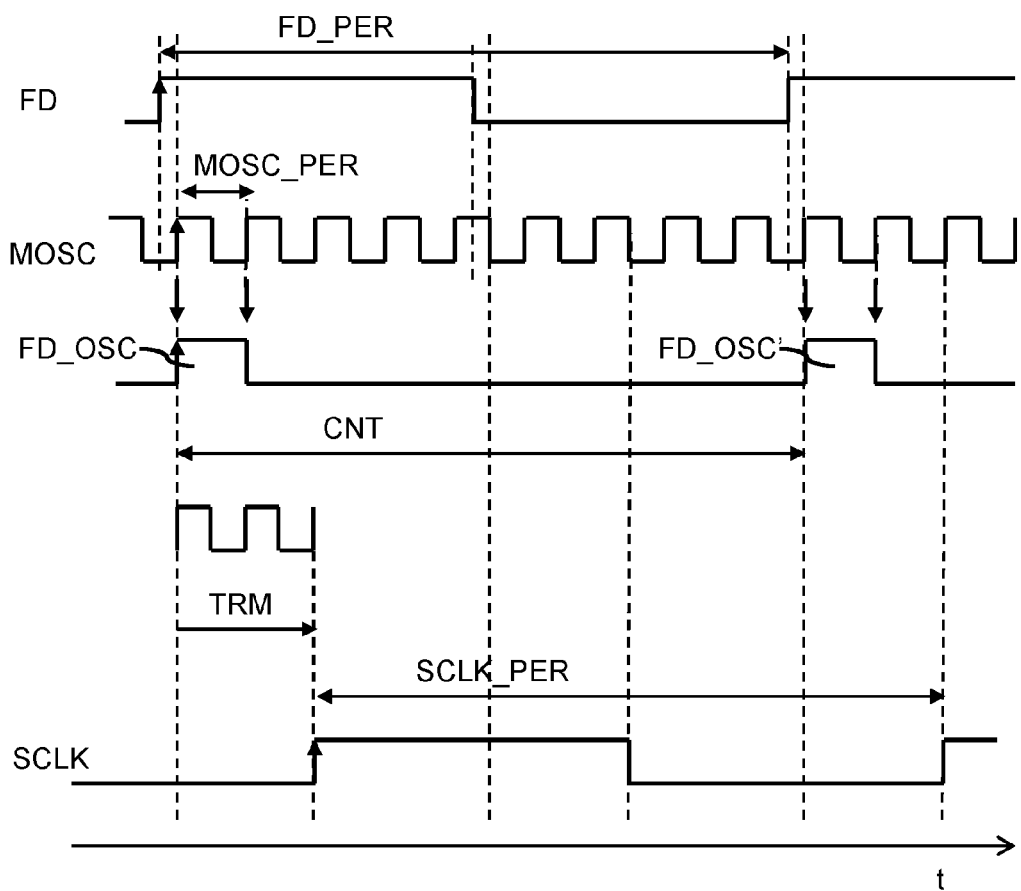
FIG. 4 is a timing diagram showing digital signals indicating a possible operation of the example of FIG. 3.

The sample clock generator SCG shown in FIG. 3 is arranged to generate a sample clock signal SCLK from an input signal FD. The sample clock generator SCG comprises an (high frequency) oscillator HFOSC, a synchronization unit SYN, a count register CNTRREG, a multiplier MULT and a delay unit DLY. The input signal FD is a signal derivable from a drive measurement voltage signal DMV of a vibrating MEMS gyroscope VMEMS, and may correspond to the digital signal FD described with reference to FIG. 2. The oscillator HFOSC is arranged to generate a master clock MOSC with a master clock period MOSC_PER, as indicated in FIG. 4. It will be appreciated that the master clock MOSC has been drawn at a lower master clock frequency than is actually used in order not to obscure the FIG. 4.

The synchronization unit SYN is arranged to receive the input signal FD. The synchronization unit SYN is arranged to generate a synchronization pulse FD_OSC from the input signal FD. Hereto, the synchronization unit is arranged to detect a start of an input signal period FD_PER of the input signal FD and to, upon detecting the start, generate a synchronization pulse FD_OSC in synchronization with the master clock MOSC. As an example, FIG. 4 shows that, at a rising edge of the indicated master clock period MOSC_PER, the input signal FD has changed from input signal level '0' to input signal level '1', corresponding to the start of an input signal period FD_PER of the input signal FD. The synchronization unit SYN detects the input signal level to have changed from '0' to '1', and, upon detecting such change so as to detect the start of an input signal period FD_PER, generates a synchronization pulse FD_OSC in synchronization with the master clock MOSC and having a length of, in this example, one master clock period MOSC_PER. A subsequent synchronization pulse FD_OSC' is generated after a next change of input signal level '0' to input signal level '1' is detected, corresponding to the start of a subsequent input signal period of the input signal FD. Hereby, the synchronization unit SYN that effectively generates a synchronization pulse FD_OSC that is synchronized to the master clock from the asynchronous input signal FD, and that has a synchronized period in between subsequent synchronization pulses FD_OSC, FD_OSC' as an integer multiple of the master clock. It will be appreciated that, in an alternative example, changes from '1' to '0' may be detected and used to generate the synchronization pulse.

Figure 5:
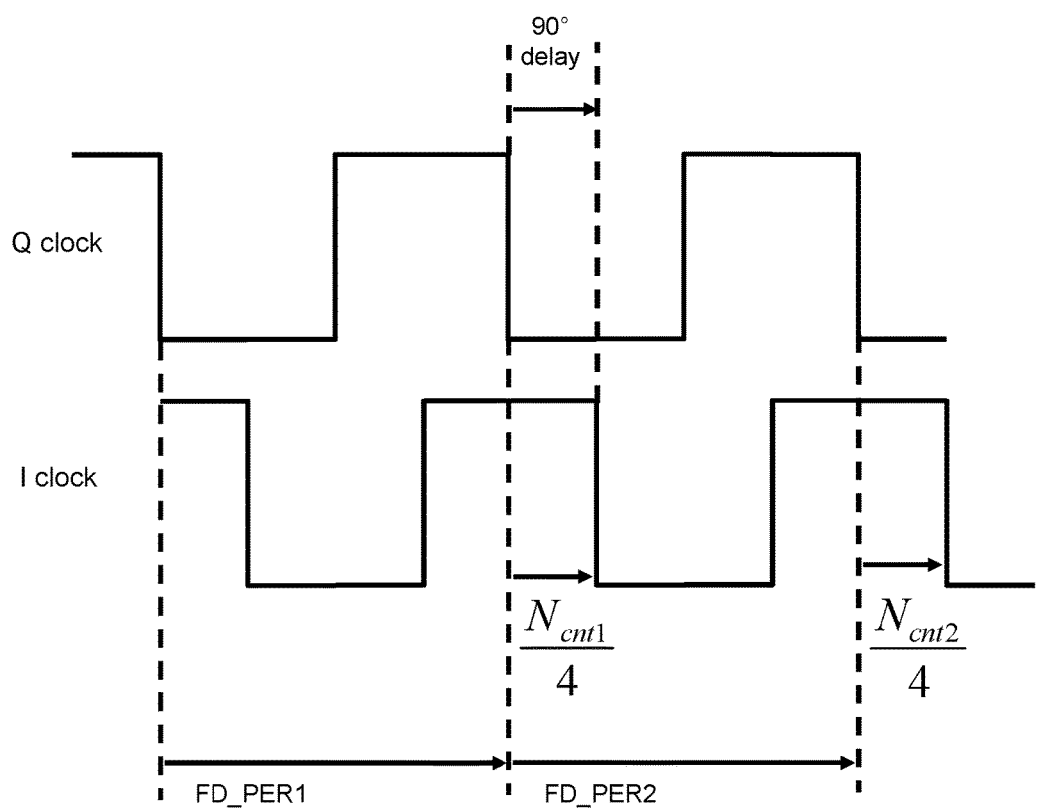
FIG. 5 is a timing diagram showing other digital signals indicating a possible operation of the example of FIG. 3.

The counter unit OSCCNTR is arranged to count master clock periods between subsequent synchronization pulses FD_OSC, FD_OSC' to obtain the number of master clock periods between subsequent synchronization pulses as a number count. The number count is indicated in FIG. 5 with reference symbol CNT. The number count thus expresses the length of a period between subsequent synchronization pulses FD_OSC and FD_OSC' in master clock periods MOSC_PER.

The counter unit OSCCNTR is arranged to provide the number count, while counting, to the count register CNTRREG. The count register CNTRREG is arranged to store the number count. The count register comprises a latch input for receiving the synchronization pulse FD_OSC for latching the number count as stored in the count register to the multiplier MULT upon receiving the synchronization pulse FD_OSC. The number count is provides as an n-bit number, as indicated by the n next to the signal line connecting the counter unit OSCCNTR to the count register CNTRREG. The number of bits n may for example be in a range of 5-12 to reflect a ratio between the period of the input signal and the master clock period of, e.g. 50-1000 times, but may alternatively a larger number.

The counter unit OSCCNTR may further comprise a reset input for receiving the synchronization pulse FD_OSC, the counter unit being arranged to reset a counter upon receiving the synchronization pulse FD_OSC. The counter unit OSCCNTR may be arranged to increment the counter at each master clock period and to store the counter in the count register CNTRREG. The counter unit OSCCNTR may thus be arranged to initialize the counter in synchronization with each synchronization pulse and increment the counter at each subsequent master clock period to count the number of master clock periods and let the count register CNTRREG store the number of master clock periods as thus counted, while the count register CNTRREG will latch the number at a subsequent synchronization pulse to provide the number count representing the number of master clock periods between the synchronization pulse FD_OSC and the subsequent synchronization pulse FD_OSC'.

The multiplier MULT is arranged to establish a pre-determined phase shift fraction PhPerc. The pre-determined phase shift fraction PhPerc may be provided as a percentage, or in any other suitable form that allows the multiplier to convert it into a fraction. The multiplier MULT may, e.g., retrieve the pre-determined phase shift fraction PhPerc from a non-volatile memory, or receive the pre-determined phase shift fraction PhPerc from a user, such as a controller arranged to operate and control the vibration gyroscope circuitries DRIVE that comprises the sample clock generator SCG. The multiplier MULT is arranged to multiply the number count of master clock periods with a pre-determined phase shift fraction PhPerc to obtain a number of trim periods TRM. The number of trim periods TRM hereby substantially corresponds to the pre-determined phase shift fraction in master clock period units.

The delay unit DLY is arranged to receive the synchronization pulse FD_OSC from the synchronization unit SYN and to receive the number of trim periods TRM from the multiplier. The delay unit DLY is arranged to generate the sample clock signal SLCK with a clock signal period SCLK_PER corresponding to the number count CNT and with a delay relative to the synchronization pulse FD_OSC corresponding to the number of trim periods TRM. The delay is indicated with arrow labelled TRM in FIG. 4. If the input period FD_PER of the input signal FD varies more than one master clock period, the number counter (i.e., the number of master clock periods in the input period FP_PER as counted by the counter unit OSCCNTR) will vary, the number of TRM periods will be adjusted proportionally, while the sample clock signal SCLK substantially maintains its phase relation with the input signal FD. The delay unit DLY may hereto comprise a delay counter arranged to, upon receiving the synchronization pulse FD_OSC, count a number of master clock periods corresponding to the number of trim periods TRM, and, after its number of master clock periods has lapsed, generate a period of the sample clock signal from first outputting the sample clock signal SCLK at a sample clock signal level corresponding to a first logical level, for example '1', during a number of master clock periods corresponding to half of the number count (the number count corresponding to the number of master clock periods between subsequent synchronization pulses) and subsequently outputting the sample clock signal SCLK at a sample clock signal level corresponding to a, different, second logical level, for example '0', during a number of master clock periods corresponding to half of the number count. The sample clock signal SCLK is thereby synchronized with the master clock MOSC. The synchronization unit SYN, the counter unit OSCCNTR, the multiplier MULT, the count register CNTRREG and the delay unit DLY are arranged to be clocked with the master clock MOSC. Hereby, the registers may be cleared, shifted or readout every master clock period.

The master clock MOSC may have a master clock frequency in a range of 20-2000 times the frequency of the input signal FD, such as in a range of 50-1000 times the frequency of the input signal FD, or in a range of 100-500 times the frequency of the input signal FD.

If the SCG is used in the circuitry of FIG. 2, the frequency of the input signal FD relates to the oscillation frequency of the vibrating MEMS gyroscope VMEMS having a resonance frequency in a range of 1 kHz-100 kHz. In case the ICLK signal needs to shift exactly 90 degrees with respect to the Q_CLK, the Phperc will be 0.25 which means that the number count CNT is divided by 4. This situation is shown in FIG. 5 where only the signals Q_CLK and ICLK are shown. During a first period FD_PER1 a number count Ncnt1 is determined and during a following period FD_PER2 a number count Ncnt2 is determined.

The inventors have found that at regular moments in time the number of number count Ncnt(i) increases or decreases with 1, i.e. Ncnt(i+1)=Ncnt(1)+1 or Ncnt(i+1)=Ncnt(i)−1, with i being a period index. This change occurs only for one FD_PER period after which Ncnt is back to its previous value, i.e. Ncnt(i+2)=Ncnt(i). This phenomenon creates a phase step on the ICLK signal, i.e. a sudden temporary phase change. Such a phase shift may create unwanted noise in the bandwidth of the receiver receiving the measured angular rates.

The inventors have found that this periodic phase shift and phase jump on the I clock may create a beating at a certain frequency in the output signal of the ADC. It has been found that the creation of the beating depends on a ratio Fclk/Fd, with Fclk the oscillator frequency equal to 1/MOSC_PER and the drive frequency Fd equal to 1/FD_PER. It showed that the closer the ratio Fclk/Fd is from an integer number, the lower the beating frequency. At some point this beating will be so low that it will fall in the receiver's signal bandwidth. This will result in a degrading noise performance.

Figure 6:
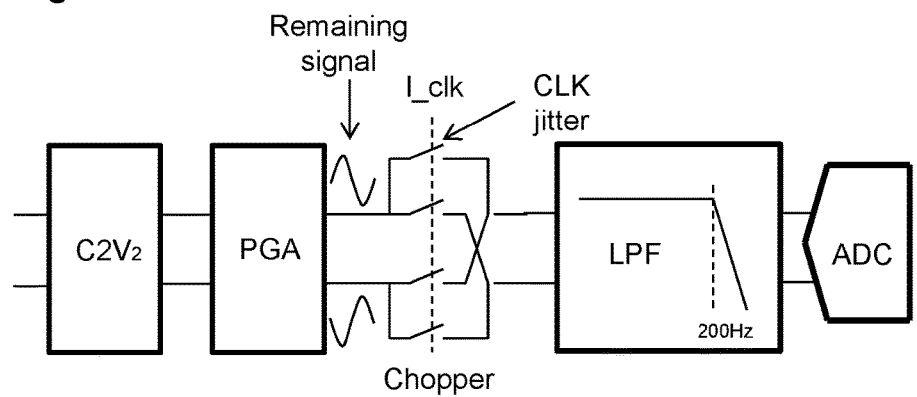
FIG. 6 a block diagram schematically showing a circuitry used to perform simulations of the SENSE circuitry.
Figure 7:
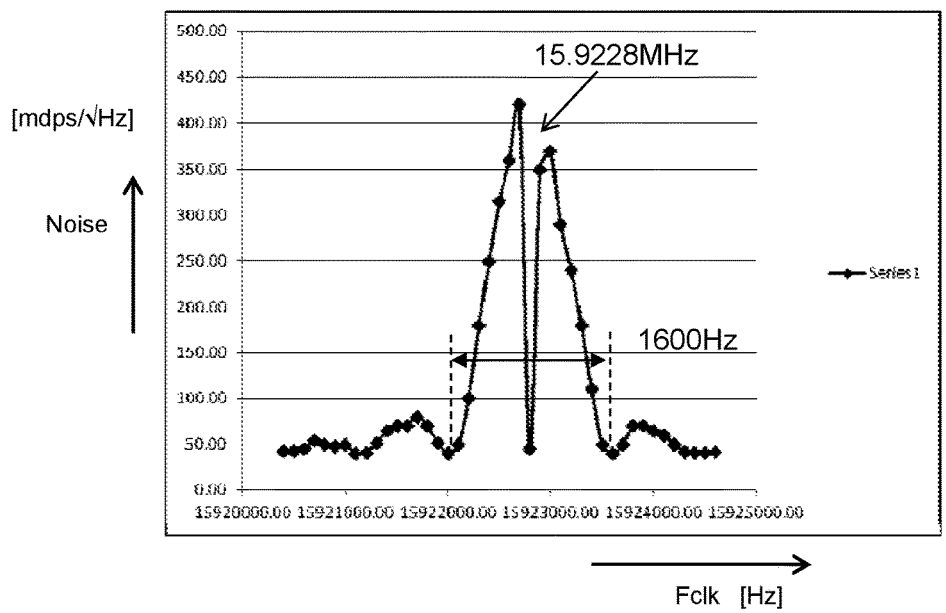
FIG. 7 shows a graph of a noise level of the simulated output signal of the ADC as a function of the clock frequency Fclk.

To show the significance of this problem some measurements were taken with reference to FIGS. 6-7. FIG. 6 schematically shows a circuitry used to perform simulations of the SENSE circuitry. The measured SENSE circuitry comprises the C2V2, the PGA, the LPF and the ADC as described above. In this example the LPF has a cut-off frequency of 200 Hz. Between the PGA and the LPF a chopper is inserted in order to demodulate the rate signal being amplified by the C2V and PGA blocks. The clock used for this demodulation has to be in phase with the wanted signal, thus called I clock. This I clock is digitally generated by phase shifting by 90° the Q clock by making use of a synthesizer similar to the one previously explained. In order to reveal the effect of this beating, an external high frequency clock was used as a clock source for the frequency synthesizer. This external generator could be tuned to a frequency that falls very near an integer multiple of the drive frequency of the gyroscope.

In order to make the occurrence of this problem more visible, the remaining signal at the output of the PGA (Programmable Gain Amplifier) was artificially increased by under compensating the level of quadrature within the sense circuitry. As a result, by sweeping the external clock source HFOSC within the sensitive spectral areas, the noise measured at the output of the gyroscope proved to increase far above acceptable range.

The in-band beating occurs when the relationship between the clock frequency Fclk and the drive frequency Fd is to be such that it can be described by the mathematical relationship:

$$F_{clk} = N_i \cdot Fd +/- \Delta f \text{ with } \Delta f \leq \Delta f\_crit \quad (1)$$

$N_i$ representing an integer value varying from 1 to $N_{max}$, with $N_{max} < F_{clk}/\text{Fin}$.

Fd representing the frequency of the drive signal,

Fclk representing the clock frequency, $\Delta f$ representing a difference value equal to the distance between $F_{clk}$ and the closest multiple of Fd, $\Delta f\_crit$ representing a critical value within which the beating created on the I clock will fall within the gyroscope bandwidth and will degrade its performance.

FIG. 7 shows a graph of a noise level of the measured output signal of the ADC as a function of the clock frequency Fclk. The following parameter values were used: Fclk=2 MHz, Fd=19706 Hz, quad level=250 dps.

As can be seen from FIG. 7 the noise level is low except for two regions around the frequency 15.9228 MHz. Across a bandwidth of 1600 Hz unwanted noise is present. It can be seen in this example that $\Delta f\_crit=800$ Hz.

The results of the FD period measurement performed by the OSCCNTR and the CNTREG, see FIG. 3, will always fluctuate among two values: N and N+1 (or N−1). The clock frequency at which the N+1 count occurs can give a precise idea of how far Fclk is from an integer multiple of the drive frequency, i.e. what the value is of the difference value $\Delta f$. The difference value $\Delta f$ is a real value which can be calculated by performing an operation as can be described by the mathematical relationship:

$$\Delta f = \text{minimum}(F_{clk} - N_i \cdot \text{Fin}) \quad (2)$$

In which $N_i$ represents an integer value varying from 1 to $N_{max}$, with $N_{max} < F_{clk}/\text{Fin}$.

As suitable operation can for example be one that can be described as "look for an integer multiple $N_i$ that results in a minimum $\Delta f$".

According to an embodiment, the frequency of the local oscillator HFOSC is shifted by a proper amount (e.g. a few kHz) when Fclk is within a distance from an integer multiple of the drive frequency that may cause a noise degradation. For this purpose the local oscillator HFOSC is arranged to shift the (master) clock frequency. The clock frequency Fclk may be varied to e.g. four different values as will be explained in more detail below.

In order to able to detect the frequency at which the N+1 count occurs, the sample clock generator SCG comprises a number count monitor NCM, see FIG. 3, arranged to determine during how many input signal periods the number count stays constant, to obtain a number of constant periods Ncp. The number count monitor NCM will compare the number of constant periods Ncp with a the critical number of constant periods $N_{cp\_crit}$. The value for $N_{cp\_crit}$ may be determined by performing an operation as can be described by the mathematical relationship:

$$N_{cp\_crit} = \text{Fin}/\Delta f \quad (3)$$

With:

$N_{cp\_crit}$ representing the critical number of constant periods,

Fin representing a frequency of the input signal FD, $\Delta f$ representing the difference value.

The SCG also comprises a frequency shifter FSH arranged to receive the number of constant periods $N_{cp}$ from the number count monitor NCM. The frequency shifter FSH will trigger the oscillator HFOSC to shift the master clock frequency whenever the number count monitor NCM has determined that the number of constant periods Ncp exceeds the critical number of constant periods $N_{cp\_crit}$.

The inventors have found that if the value $\Delta f$ is too low, the number of constant periods $N_{cp}$ will be too high and will create a beating in the rate signal which is below the cut-off frequency of the low pass filter LPF. By properly shifting the master clock frequency a certain amount, the value of $\Delta f$ is increased. As a result the number of periods during which the Ncnt is constant (i.e. $N_{cp}$), will decrease. And decrease of the $N_{cp}$ will increase the beating frequency. Once this beating frequency is above the cut-off frequency of the low pass filter LPF, the beating will be filtered out and the rate signal will not show any noise caused from the sample clock generator SCG.

Figures 8, 9:
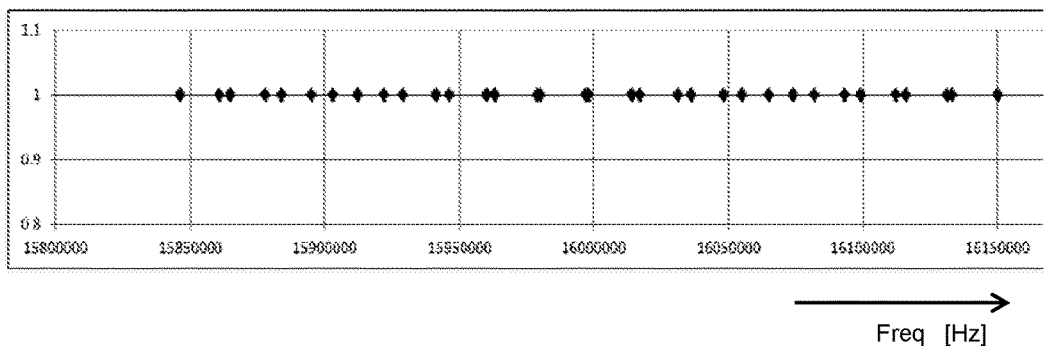
FIG. 8 is a table listing harmonics of the frequencies 17 kHz and 19 kHz around 16 MHz.
FIG. 9 shows the harmonics of the frequencies 17 kHz and 19 kHz around 16 MHz all having a value of 1.

In case a rate signal needs to be measured for both a xy-direction and a z-direction, the VMEMS gyroscope may comprise two primary masses vibrating at two drive frequencies. The proposed solution described above can also work for two drive frequencies using a single oscillator HFOSC. In the example below the two drive frequencies are 17 kHz and 19 kHz and the clock frequency Fclk is 16 MHz. FIG. 8 shows a list of all harmonics of the frequencies 17 kHz and 19 kHz around 16 MHz. As can be seen from FIG. 8 the value for $\Delta f$ is very small at the XY harmonics 941 and 942 and the Z harmonics 842 and 843. To make this more visually FIG. 9 is showing the harmonics of the frequencies 17 kHz and 19 kHz around 16 MHz all having a value of 1. (all dots are on the same horizontal line) From FIG. 9 it shows that the two dots are very close to the frequency of 16 MHz.

Figure 10:
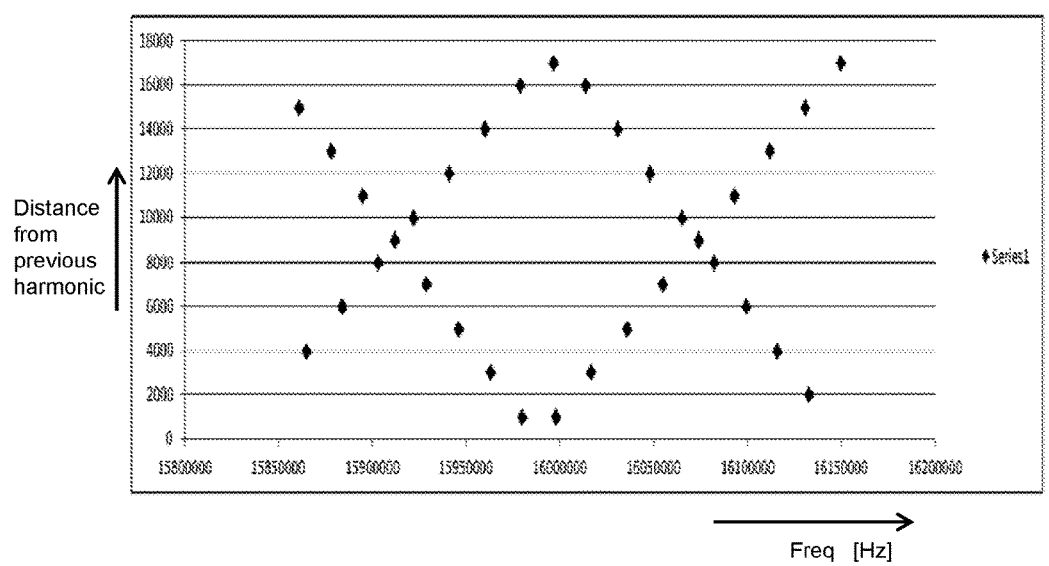
FIG. 10 shows the harmonics (i.e. dots) of FIG. 9 where each harmonic is given a Y-value of the frequency spacing with its previous harmonics in FIG. 9.

FIG. 10 shows the harmonics (i.e. dots) of FIG. 9 where each harmonic is given a Y-value of the frequency spacing with its previous harmonics in FIG. 9, starting with the second dot of FIG. 9. In this way the distribution of the dots can be made more visible. From FIG. 10 it can be seen that if Fclk is shifted from 16 MHz to 16 MHz+/−4 kHz a safe (i.e. non-critical) clock frequency can be found. An oscillator with three predefined clock frequencies would be sufficient for this exemplary system to work, e.g. Nominal, +4 kHz and −4 kHz. In practice we will have four positions: Nominal, +4 kHz, −4 kHz and −8 kHz.

Figure 11:
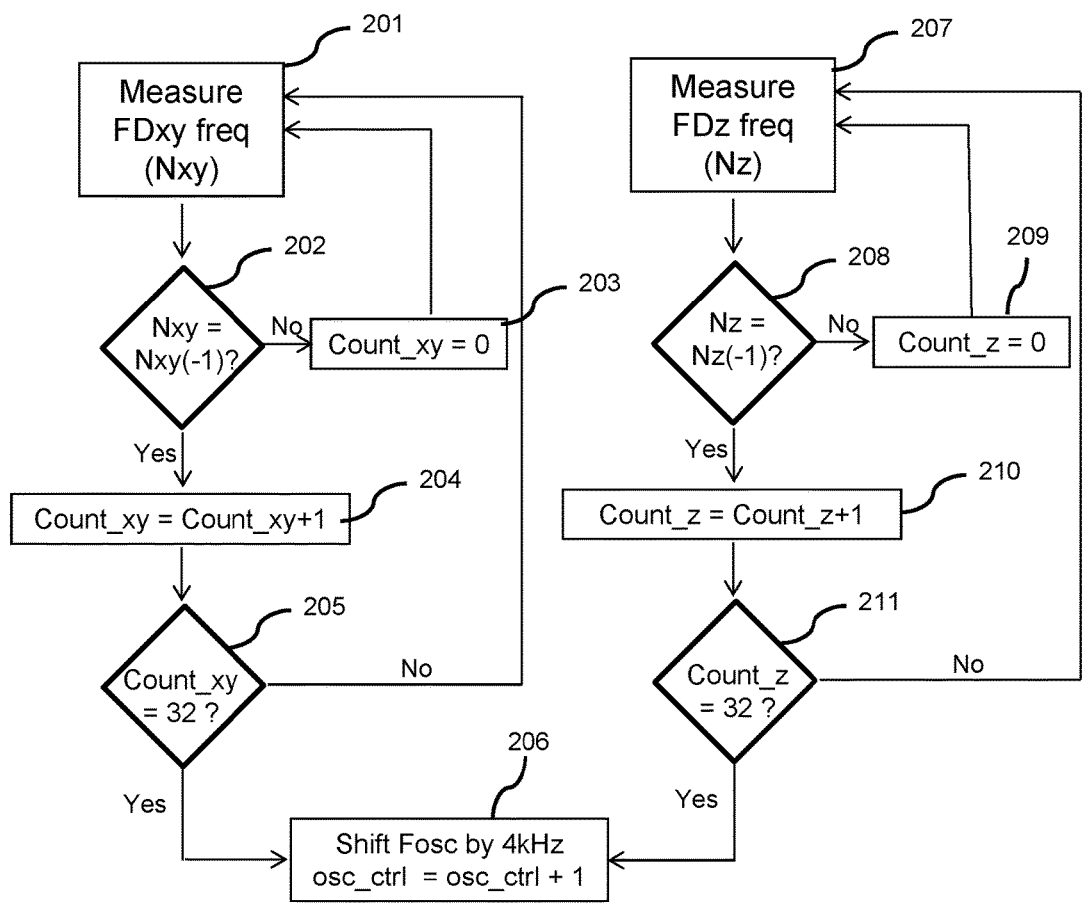
FIG. 11 shows a flow chart of such a method performed in the SCG.

In an embodiment, the sample clock generator comprises two counters arranged to monitor the number of constant periods $N_{cp}$, one counter for each drive signal. FIG. 11 shows a flow chart of such a method performed in the SCG.

In a block 201 the number of constant periods $N_{cp}$ for the FDxy drive signal is repeatedly counted, i.e. Nxy. This number count is compared in a test 202 with a previous value of Nxy being Nxy(−1). If Nxy is not equal to Nxy(−1) then a counter Count_xy is set to 0 in a block 203 and the method returns to block 201. If Nxy=Nxy(−1) then the counter Count_xy is increased by one in a block 204 and a test 205 follows in which the counter Count_xy is compared to a critical value for $N_{cp}$ being 32 in this example. If the counter has not reached 32 yet, then the method returns to block 201. If the critical value has been reached, the method proceeds to a block 206 in which the master clock oscillator frequency is shifted by a proper amount, in this example 4 kHz. This is achieved by increasing a simple 2-bits digital value by 1, which value may be used to control switches of a clock circuitry as will be explained with reference to FIG. 12. A similar process is performed for the monitoring of the number of constant periods $N_{cp}$ for the FDz drive signal as is shown by blocks 207, 208, 209, 210, 211.

A suitable value for calculating Ncp_crit is to use the following equation:

$$Ncp\_crit = Fd/\Delta f, \text{ with} \qquad (4)$$

With:
Fd representing the drive frequency
Δf representing the beating frequency.

For example, in the case of an 18 kHz drive frequency, a value for Ncp_crit of 32 will make that beating occur at a 562 Hz, which is far enough outside of the band in the case of a 50 Hz gyroscope bandwidth. Optimal value for Ncp_crit can be made based on system parameters such as bandwidth, drive frequency and master clock frequency.

The clock frequency Fclk will be sifted to a next pre-defined frequency until it reaches a position (i.e. a frequency) with both the FDxy signal and FDz signal finding a high enough Ncp value occurrence:

01: +4 kHz
00: nominal e.g. 16 MHz
10: −4 kHz
11: −8 kHz

Figure 12:
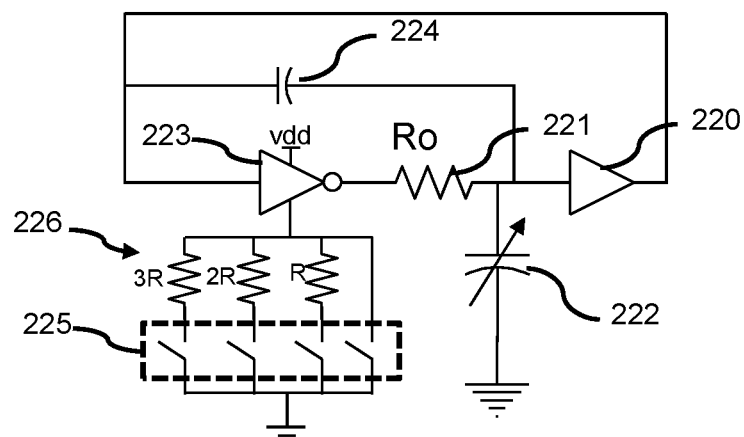
FIG. 12 schematically shows a clock circuitry for generating the clock frequency Fclk according to an embodiment.

FIG. 12 schematically shows a clock circuitry for generating the clock frequency Fclk according to an embodiment. The circuit comprises an amplifier 220 receiving an output voltage of a RC circuit comprising a resistor 221 and a tunable capacitor 222. Furthermore the circuit comprise an invertor 223 for inverting a feedback of the output signal of the amplifier 220. Also a capacitor 224 is provided which is coupled between the input of the amplifier 220 and the input of the invertor 223. The inventor 223 is powered by a voltage Vdd and connected to ground via a switchable circuit comprising four parallel paths each comprising a controllable switch 225. Three of the paths comprise a resistor 226. Typical values are Ro=400K and R=0.025%*Ro.

By controlling the four switches the clock circuit is able to generate four different output clock frequencies. This may the four frequencies mentioned above, or any other frequencies. The controllable switches may be controlled by using a two-bits digital values as mentioned above.

If the nominal frequency for the master clock is 16 MHz, a 4 kHz shift represents 0.025%, which a very small shift. So the beat occurring within the bandwidth of the receiver is removed by shifting the master clock frequency a relatively small amount. In reality, since the digital sample clock generator SCG is auto-adaptive, the frequency shift does not have to be very accurate. +/−50% is good enough since if it is not, the SCG will move to the next position.

Figure 13:
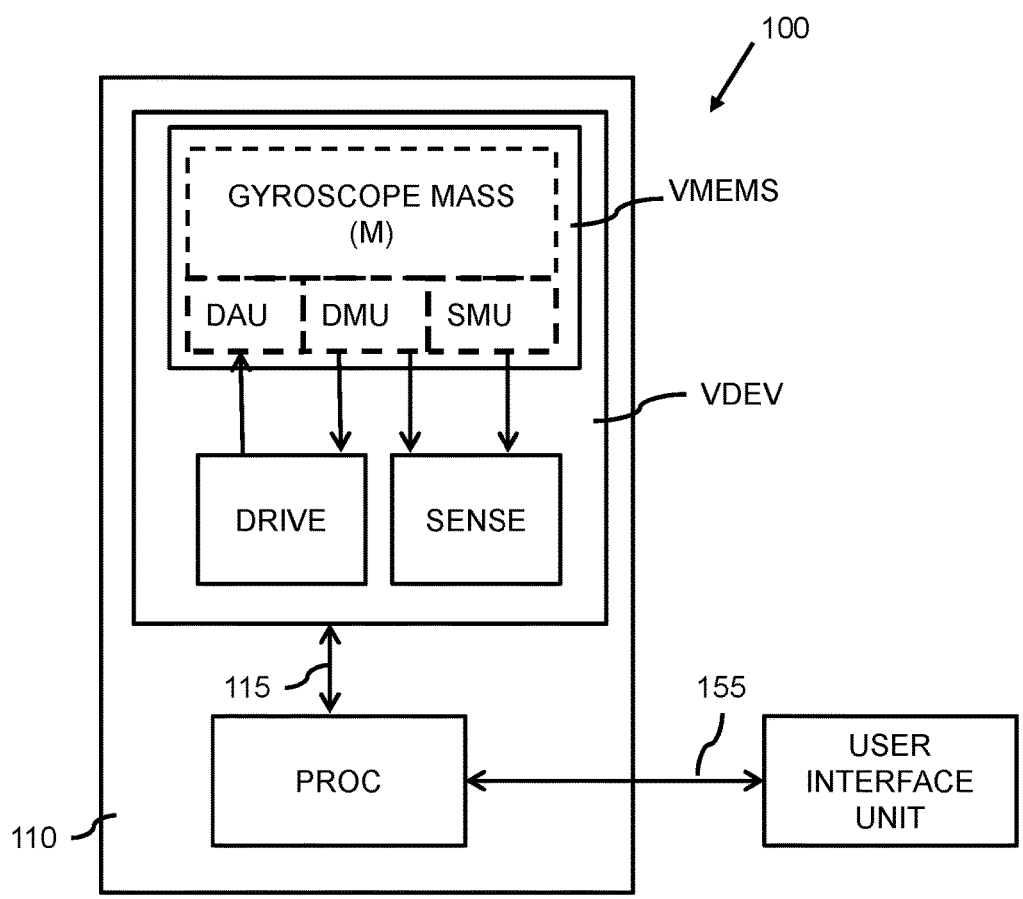
FIG. 13 schematically shows an example of an embodiment of an apparatus.

FIG. 13 schematically shows an example of an embodiment of an apparatus 100. The apparatus 100 may, for example, be a mobile communication device, a global positioning device, a game controller or a security system for e.g. a car lock.

The apparatus 100 comprises a gyroscope unit 110 and a user interface unit 150. The gyroscope unit 110 comprises a vibration gyroscope device VDEV and a control processor PROC. The user interface unit 150 is arranged to receive user input from, e.g., a key board, a mouse, another user input device, a memory device or another communication device. The user interface unit 150 is further arranged to present information to a user, e.g., via a display or audible signals. The gyroscope unit 110 may be provided as a semiconductor device. The control processor PROC is connected to the vibration gyroscope device VDEV via a gyroscope interface signal line 115 and arranged to communicate with the vibration gyroscope device VDEV via the gyroscope interface signal line 115. The control processor PROC may hereby provide the drive circuitry DRIVE and the sense circuitry SENSE with the reference envelope amplitude RefAmp, the respective pre-determined in-phase phase shift fraction(s) PhI. The control processor PROC is connected to the user interface unit 150 via a user interface signal line 155 and arranged to communicate with the user interface unit 150 via the user interface signal line 155. In this example, the vibration gyroscope device VDEV comprises a vibration MEMS gyroscope VMEMS, a drive circuitry DRIVE and a sense circuitry SENSE. The drive circuitry DRIVE is connected to the drive actuation unit DAU and the drive measurement unit of the VMEMS, as described in reference to FIG. 2. The sense circuitry SENSE is connected to the drive measurement unit of the VMEMS and the sense measurement unit of the VMEMS, as described in reference to FIG. 2 and is arranged to provide the determined measure AROT.

According to other embodiments, the vibration gyroscope device VDEV may comprise a vibration MEMS gyroscope and a vibration gyroscope circuitry comprising a drive circuitry DRIVE according to an embodiment and/or a sense circuitry SENSE according to an embodiment.

According to other aspects, a semiconductor device comprising a digital sample clock generator SCG according to an embodiment, a vibration gyroscope circuitry VCIRC according to an embodiment, or a vibration gyroscope device VDEV according to an embodiment is provided.

Figure 14:
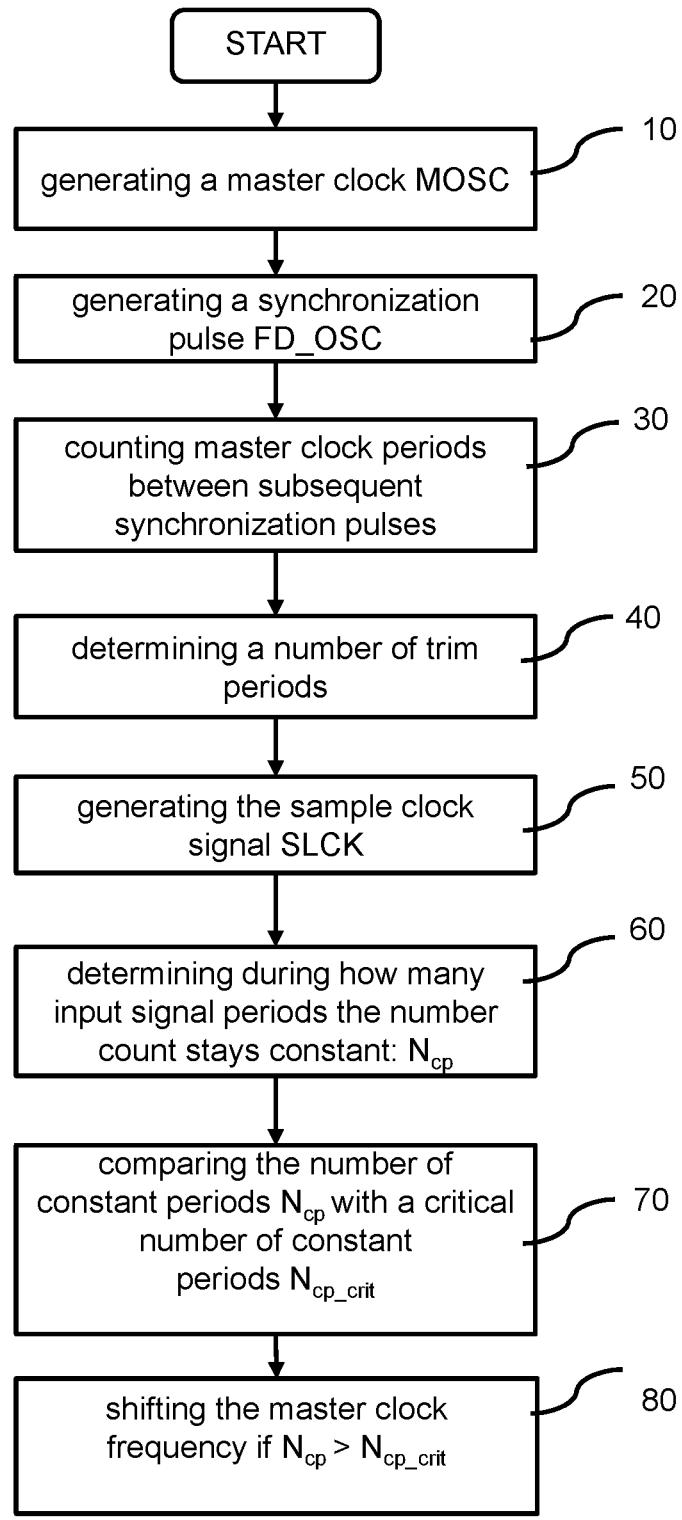
FIG. 14 schematically shows an example of an embodiment of a method of generating a sample clock signal from an input signal.

FIG. 14 schematically shows an example of an embodiment of a method of generating a sample clock signal SCLK from an input signal FD. The method comprises generating a master clock (MOSC) with a master clock period, see block 10. Next, see block 20, generating 20 a synchronization pulse FD_OSC from detecting a start of an input signal period FD_PER of the input signal FD and, upon detecting the start, generating the synchronization pulse (FD_OSC) in synchronization with the master clock (MOSC). Next in a block 30, counting master clock periods between subsequent synchronization pulses to obtain the number of master clock periods between subsequent synchronization pulses as a number count. A block 40 represents determining a number of trim periods by multiplying the number count with a pre-determined phase shift fraction PhPerc. Block 50 represents generating the sample clock signal SLCK with a clock signal period SCLK_PER corresponding to the number count CNT and with a delay relative to the synchronization pulse corresponding to the number of trim periods TRM. Next, see block 60, it is determined during how many input signal periods the number count stays constant, to obtain a number of constant periods (Ncp). And then in block 70 the number of constant periods (Ncp) is compared with a critical number of constant periods (Ncp_crit). And finally in a block 80, the master clock frequency is shifted whenever the number of constant periods (Ncp) exceeds the critical number of constant periods (Ncp_crit).

A method of determining a measure of an angular rotation rate using a vibration MEMS gyroscope is also provided. The method comprises generating an in-phase sample clock as described above while using a pre-determined in-phase phase shift fraction PhI as the pre-determined phase shift fraction PhPerc, obtaining a sense measurement voltage signal SMV indicative of a displacement of the gyroscope mass M along a sense axis y, the sense axis x being at a sense angle relative to the drive axis x, sampling the sense measurement voltage signal DMS with the in-phase sample clock ICLK to obtain in-phase sense sample values, and determining the measure AROT of the angular rate from at least the in-phase sense sample values.

In the foregoing specification, the invention has been described with reference to specific examples of embodiments of the invention. It will, however, be evident that various modifications and changes may be made therein without departing from the broader scope of the invention as set forth in the appended claims. For example, the connections may be any type of connection suitable to transfer signals from or to the respective nodes, units or devices, for example via intermediate devices. Accordingly, unless implied or stated otherwise the connections may for example be direct connections or indirect connections.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

It is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments. Furthermore, the devices may be physically distributed over a number of apparatuses, while functionally operating as a single device. Also, units may be shared. For example, where a vibration gyroscope circuitry comprises a drive circuitry DRIVE and a sense circuitry SENSE, a single threshold detector ThrM may be shared between the drive circuitry DRIVE and the sense circuitry SENSE. Also, devices functionally forming separate devices may be integrated in a single physical device.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A vibration gyroscope circuitry (VCIRC) connectable to a vibrating MEMS (micro-electro-mechanical-system) gyroscope (VMEMS), the circuitry comprising:
   a drive circuitry (DRIVE) arranged to drive, when said vibration gyroscope circuitry (VCIRC) is connected, the vibrating MEMS gyroscope (VMEMS) and comprising a drive measurement circuit (DMU) arranged to provide a drive measurement voltage signal (DMV) forming a measure of a displacement of a gyroscope mass (M) along a drive axis; and
   a sense circuitry (SENSE) is arranged to, when said vibration gyroscope circuitry (VCIRC) is connected, process a sense measurement signal of the vibrating MEMS gyroscope (VMEMS) forming a measure for a displacement of said gyroscope mass (M) along a sense axis when said gyroscope mass (M) is being displaced along the drive axis by the drive circuitry, wherein the displacement of the gyroscope mass (M) along the sense axis occurs in the presence of angular rotation;
   wherein the drive circuitry (DRIVE) further comprises a digital sample clock generator (SCG) for generating a sample clock signal (SCLK) from an input signal (FDxy) derivable from the drive measurement voltage signal (DMV), the sample clock generator (SCG) comprising:
      an oscillator (HFOSC) arranged to generate a master clock (MOSC) with a master clock period (MOSC_PER) and a master clock frequency ($F_{clk}$), the oscillator being arranged to shift the master clock frequency;

a synchronization circuit (SYN) arranged to detect a start of an input signal period (FD_PER) of the input signal (FDxy) and to, upon detecting the start, generate a synchronization pulse (FD_OSC) in synchronization with the master clock (MOSC);

a counter (OSCCNTR) arranged to count master clock periods (MOSC_PER) between the synchronization pulse (FD_OSC) and a subsequent synchronization pulse (FD_OSC') to obtain a number of the master clock periods (MOSC_PER) between the synchronization pulse (FD_OSC) and the subsequent synchronization pulse (FD_OSC') as a number count (CNT);

a multiplier (MULT) arranged to multiply the number count with a pre-determined phase shift fraction (PhPerc) to obtain a number of trim periods (TRM);

a delay circuit (DLY) arranged to generate the sample clock signal (SLCK) with a clock signal period (SCLK_PER) corresponding to the number count (CNT) and with a delay relative to the synchronization pulse corresponding to the number of trim periods (TRM);

a number count monitor (NCM) arranged to determine during how many input signal periods the number count stays constant, to obtain a number of constant periods ($N_{cp}$), and to compare the number of constant periods ($N_{cp}$) with a critical number of constant periods ($N_{cp\_crit}$); and a frequency shifter (FSH) arranged to trigger said oscillator to shift the master clock frequency whenever the number count monitor (NCM) has determined that the number of constant periods ($N_{cp}$) exceeds the critical number of constant periods ($N_{cp\_crit}$).

2. The vibration gyroscope circuitry (VCIRC) according to claim 1, the oscillator (HFOSC) being arranged to generate four predefined master clock frequencies.

3. The vibration gyroscope circuitry (VCIRC) according to claim 1, the pre-determined phase shift fraction (PhPerc) being 0.25.

4. The vibration gyroscope circuitry (VCIRC) according to claim 1, the master clock frequency being in a range of 50-1000 times the frequency of the input signal (FDxy).

5. The vibration gyroscope circuitry (VCIRC) according to claim 1, the frequency of the input signal (FDxy) being in a range of 1 kHz 100 kHz.

6. The vibration gyroscope circuitry (VCIRC) according to claim 1, wherein the drive circuitry (DRIVE) further comprises a first capacitance-to-voltage circuit ($C2V_1$), and a threshold detector (ThrM); and wherein:

the first capacitance-to-voltage circuit ($C2V_1$) is arranged to provide the drive measurement voltage signal (DMV) indicative of the displacement of the gyroscope mass (M) along the drive axis (x) of the vibrating MEMS gyroscope (VMEMS);

the threshold detector (ThrM) is arranged to perform a threshold detection on the drive measurement voltage signal (DMV) to obtain the input signal as a digital signal (FDxy); and the digital sample clock generator (SCG) is arranged to receive the digital signal (FDxy) and to generate the sample clock in dependence on a pre-determined in-phase phase shift fraction (PhI) as an in-phase sample clock (ICLK) so as to obtain the in-phase sample clock in-phase with the drive measurement voltage signal (DMV).

7. The vibration gyroscope circuitry (VCIRC) according to claim 6, wherein the drive circuitry (DRIVE) further comprises a peak detector (PkD), a subtractor (SUB), an integrator (INT) and a variable gain amplifier (VGA);

the peak detector (PkD) being arranged to detect a peak of the drive measurement voltage signal (DMV) to obtain a peak value;

the subtractor (SUB) being arranged to subtract the peak value from a pre-determined reference envelope amplitude (AGC_ref) to obtain a gain factor (VGA_ctrl);

the integrator (INT) being arranged to integrate the drive measurement voltage signal (DMV) to obtain an integrated drive measurement voltage signal (DMI); and the variable gain amplifier (VGA) being arranged to amplify the integrated drive measurement voltage signal (DMI) with the gain factor to obtain a drive actuation voltage signal (DAS) and to provide the drive actuation voltage signal (DAS) to a drive actuation circuit (DAS) of the vibration MEMS gyroscope (VMEMS).

8. The vibration gyroscope circuitry (VCIRC) according to claim 7, wherein the sense circuitry (SENSE) further comprises a sampler (IMOD), a second capacitance-to-voltage circuit ($C2V_2$), a low pass filter (LPF) and an analogue-digital converter (ADC);

the second capacitance-to-voltage unit ($C2V_2$) being arranged to provide a sense measurement voltage signal (SMV) indicative of the displacement of the gyroscope mass (M) along the sense axis (y), the sense axis (y) being at a sense angle relative to the drive axis (x);

the sampler (IMOD) being arranged to sample the sense measurement voltage signal (SMV) with the in-phase sample clock (ICLK) to obtain in-phase sense sample values;

the low pass filter being arranged to filter the in-phase sense sample values, to obtain filtered in-phase sense sample values; and the analogue-digital-converter (ADC) being arranged to convert the filtered in-phase sense sample values from analogue values to digital values representing a measure of an angular rate.

9. The vibration gyroscope circuitry (VCIRC) according to claim 8, the low pass filter having a cut of frequency in a range of 100-400 kHz.

10. A method of generating a sample clock signal (SCLK) from an input signal (FD), the method comprising:

generating a master clock (MOSC) with a master clock period;

generating a synchronization pulse (FD_OSC) from detecting a start of an input signal period (FD_PER) of the input signal (FD) and, upon detecting the start, generating the synchronization pulse (FD_OSC) in synchronization with the master clock (MOSC);

counting master clock periods between subsequent synchronization pulses to obtain the number of the master clock periods between the subsequent synchronization pulses as a number count;

determining a number of trim periods from multiplying the number count with a pre-determined phase shift fraction (PhPerc);

generating the sample clock signal (SLCK) with a clock signal period (SCLK_PER) as an in-phase sample clock corresponding to the number count (CNT) and with a delay relative to the synchronization pulse corresponding to the number of trim periods (TRM);

determining during how many input signal periods the number count stays constant, to obtain a number of constant periods ($N_{cp}$);

comparing the number of constant periods ($N_{cp}$) with a critical number of constant periods ($N_{cp\_crit}$); and shifting the master clock frequency whenever the number of constant periods ($N_{cp}$) exceeds the critical number of constant periods ($N_{cp\_crit}$).

11. The method according to claim 10, further comprising:

obtaining a drive measurement voltage signal (DMV) indicative of a displacement of a gyroscope mass (M) along a drive axis (x) of a vibrating MEMS gyroscope (VMEMS); and performing a threshold detection on the drive measurement voltage signal (DMV) to obtain a digital signal (FD) as the input signal (FD).

12. The method of determining a measure of an angular rotation rate using the vibration MEMS gyroscope, the method comprising:

generating the in-phase sample clock using the method according to claim 11 using a pre-determined in-phase phase shift fraction (PhI) as the pre-determined phase shift fraction (PhPerc);

obtaining a sense measurement voltage signal (SMV) indicative of the displacement of the gyroscope mass (M) along a sense axis (y), the sense axis (y) being at a sense angle relative to the drive axis (x);

sampling the sense measurement voltage signal (SMV) with the in-phase sample clock (ICLK) to obtain in-phase sense sample values; and determining the measure (AROT) of the angular rotation rate from at least the in-phase sense sample values.

* * * * *